Figure 1:
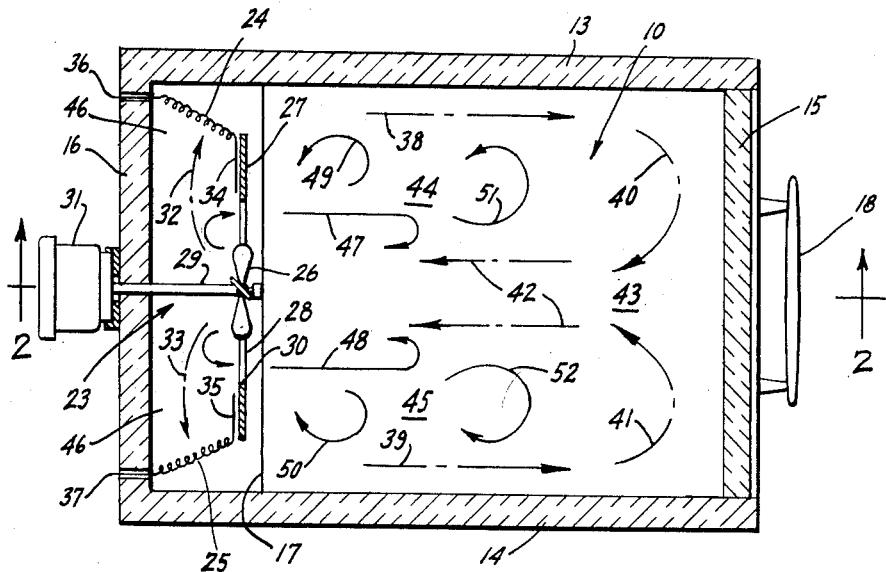

Oct. 18, 1960　　　D. W. SCOFIELD　　　2,957,067
APPLIANCE UNITS
Filed Aug. 14, 1958

INVENTOR.
DONALD W. SCOFIELD
BY
F. D. Pregar
ATTORNEY

United States Patent Office 2,957,067
Patented Oct. 18, 1960

2,957,067

APPLIANCE UNITS

Donald W. Scofield, Glenside, Pa., assignor to Philco Corporation, Philadelphia, Pa., a corporation of Pennsylvania Filed Aug. 14, 1958, Ser. No. 755,017

3 Claims. (Cl. 219—35)

This invention relates to ovens for the baking of pastry and the like and is especially concerned with "forced circulation" means for such ovens.

In the interest of efficiency of heat application it is desirable to design a baking oven in accordance with the form of the goods to be baked therein. Particularly, such an oven should be relatively wide and low if flat articles, such as pies or cakes or cookies, are to be prepared therein. Relatively wide and flat compartments have therefore been used in certain types of ovens, including ovens for the baking of cakes, bread, and the like, and the desirability of an oven compartment of such form has long been recognized.

A difficulty has however been encountered upon the advent of electrical resistance heater coils and the like. Such devices can and should be operated at surface temperatures conductive to local conditions of red heat, or even approaching white heat, in other words, temperatures substantially above those commonly desired in a pastry baking zone or the like. In a variety of appliances, the resulting steepness of thermal gradient, from heater element to heated zone, is harmless or even desirable, but in pastry baking ovens and the like, the concentrated heat output pattern of electrical resistance heaters and the like has presented a problem. It has caused bothersome irregularity of heat distribution, mainly when attempts were made to economize by using ovens of suitably low design, as aforementioned.

Various proposals have therefore been made to improve electrical pastry ovens and the like, particularly by "forced circulation." One such arrangement of a pastry oven with circulation is disclosed and claimed in the copending application of Edwin Van Sciver, Ser. No. 711,573, filed January 28, 1958, entitled "Appliance Structure" and assigned to the assignee of this invention. Such arrangement involves the use of a blower fan and of a more or less adjacent heating coil, both disposed in a limited portion of the oven, the blower fan being used to blow air across the heating coil, for circulating hot air into or within the oven. It is further known to be possible and generally to be desirable—particularly in an oven of the domestic kitchen type, which may either be separate from or form part of a range—to keep the forced circulation entirely within the oven compartment and thus to avoid the cost, bulk and other requirements of ductwork and the like. It is of course necessary, however, to provide suitable controls for blower fans, as well as for the heater elements.

Even in relatively elaborate oven constructions employing forced circulation, as thus far designed, heat distribution has still been irregular, to a considerable and often deplorable extent. While further improvement of heat distribution could be and has been sought by a variety of expedients, including various internal or external duct and nozzle arrangements, such solutions of the problem have been found too complex, too expensive, too wasteful of space, and too dependent on the employment of structures which either constitute added heat-absorbing and heat-retaining masses interfering with proper heating economy, or lead to difficulties because of noisy operation, inadequate rigidity, and the like.

It has therefore been a general object of this invention to overcome the problems which have been indicated and to provide a wide and low oven, not only with heaters of the indicated type but also with improved circulation means, to insure substantially uniform distribution of heat, while using a minimum of extra ducts, nozzles and other means or structures, added to the oven compartment, the circulator and the heater. It is a further object, in the interest of economy, to avoid any use of special, non-standard types of air circulators, motors and/or heaters.

These and other objects have been achieved by a new combination of elements including a blower fan installation which may be said to be characterized by a certain type of pneumatic inefficiency. It may also be said that certain short-circuiting and/or eddying effects are used. These expedients, which are believed to be new to the present art, were found to add greatly to the efficiency of the oven, as a heat distributing device, in the baking of pastry and the like.

Figure 2:
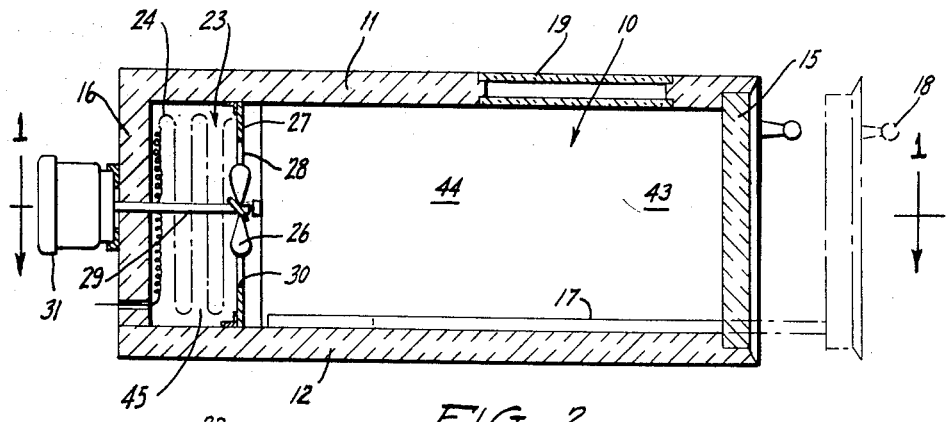
Figure 3:
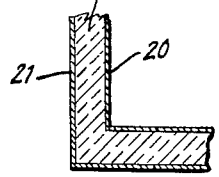

Ways in which the circulator and the cooperating elements can be arranged, in accordance with the invention, will readily be understood on consideration of the drawing appended hereto, wherein Figure 1 is a sectional plan view of a preferred form of the new oven, while Figure 2 is a sectional elevational view of the same. This latter view is taken along line 2—2 in Figure 1 and it in turn indicates, by line 1—1, the plan in which the section of the former view has been taken. Figure 3 shows a modified detail from Figure 2.

The oven provides a wide and low baking compartment 10, defined by flat, rectangular top and bottom walls 11, 12 and by low walls upstanding therebetween, two of the latter walls 13, 14 being disposed at the sides and two such walls 15, 16 forming the front and back of the oven. The front wall 15 also forms part of a drawer structure, being rigidly connected with a drawer bottom shown somewhat diagrammatically at 17. A handle 18 on front wall 15 serves to operate this drawer structure, as clearly indicated by Figure 2. The top wall 11 desirably has a large inspection window 19 incorporated therein, facilitating supervision of the baking process whether front 15 be open or closed. All boundary walls 11 to 16 of the oven are of mechanically sturdy and thermally efficient construction, for instance by the use of inner and outer metallic shells or liners 20, 21 with intermediate insulation 22 as shown in Figure 3.

An electrical heating and air circulating structure 23 of basically well-known type is disposed in chamber 10, adjacent rear wall 16 (Figures 1 and 2). This structure comprises a pair of heater coils 24, 25; a blower or circulator fan 26; and a combined holder, guide and baffle element 27, holding said coils and defining passageways for air, propelled by the fan. Element 27 is a heat conducting guide wall, for instance of sheet metal, extending from top 11 to bottom 12, and it extends from adjacent one side wall 13 to adjacent the other side wall 14. Said coils 24, 25 are so disposed, near the outer ends of this guide wall, that substantially all of the air flowing between the guide wall and the adjacent rear wall 16 passes across said coils.

In accordance with the invention, baffle wall 27 has a special, unusually large, central aperture 28 for fan 26, said aperture desirably being concentric with shaft 29 of the fan and having a diameter substantially greater than the diameter of the fan. In further accordance with the invention the entire baffle wall 27, or at least the portion thereof adjacent fan 26, lies adjacent the plane of rotation of the fan, and preferably no shroud structure or the like interferes with short-circuiting, outward propulsion of air, in or adjacent said plane.

Best results have been obtained, in an oven of the type illustrated and described, when the diameter of fan 26 ranges from about 70 percent, or somewhat less, to not more than about 90 percent of the effective diameter of aperture 28 in baffle wall 27, and preferably from about 70 or 75 to about 85 percent of said diameter. It may briefly be said that the fan desirably covers, when rotating, only about 65 percent of the area of the aperture. Significantly greater coverage of the aperture leads to an air flow pattern conducive to unequal distribution of heat in the oven, and other inequalities of heat distribution in the oven are caused by significantly lesser coverage. It is of course assumed that the blower fan is designed, dimensioned and operated so as to move an adequate amount of air in a representative unit of time, as is well known in this art. Thus the invention basically provides an oversized fan aperture, rather than an undersize fan. It may further be noted that, in the present fan installation, it is a matter of little importance whether the peripheral edge 30 of aperture 28 is circular, polygonal, square or of somewhat different outline.

Fan 26 is rotated by a motor 31, secured to the outside of rear wall 16 and driving fan shaft 29 in such a direction as to impel a stream of air rearwardly through aperture 28, and then outwardly, as shown at 32, 33, to and through heater coils 24, 25. These two coils are interconnected by conductors, parts of which are shown at 34, 35, and are energized by having their terminals 36, 37 connected to a suitable circuit, not shown. Accordingly circulator and heater structure 23 produces more or less jet-like currents 38, 39 of hot air, which move forwardly in chamber 10, adjacent and along side walls 13, 14.

Heretofore, as mentioned, imperfections of heat distribution were encountered when such a jet-like, forward current of heated air was applied, except when cumbersome structures were used for deflecting and distributing the air of the current. Apparently there was an inherent tendency for most of the heated air to move forwardly along the sides of the oven, to become laterally dispersed almost exclusively in the front part of the oven, as schematically indicated at 40, 41, and then to recombine into a central and relatively concentrated return stream 42. As a result, higher temperatures prevailed in a front portion 43 of the oven than in rear portions 44, 45, lying respectively between air currents 38, 42 and between air currents 39, 42. All oven portions 43, 44, 45 of course should be available as baking areas, but pastry tended to become too dark in front area 43, or too light in rear areas 44, 45 of the oven, or in some cases both types of difficulty were encountered.

These difficulties have been overcome by the above-described, peculiar baffle structure 27, which on the one hand provides an adequate air flow guiding effect, as required for thermally and convectively efficient utilization of heater coils 24, 25, while on the other hand avoiding the inequality of heat distribution in baking areas 43, 44, 45. The way in which this inequality has been avoided involves the provision of a special combination of guided and unguided circulations of air. A guided circulation, as required for efficient utilization of somewhat extended heating coils 24, 25, is provided in back of wall 27, where said wall and rear wall 16 form passages 46 leading from blower fan 26 to said heater coils. Elsewhere, and particularly in the direct or immediate peripheral area surrounding the blower fan, no guiding effect is provided, so that mixed centrifugal and axial, forward and rearward air currents are created, said rearward air currents returning toward the areas 44, 45 in front of baffle 27. These returning currents, short-circuiting the circulations shown at 32—38—40—42 and at 33—39—41—42, are indicated by solid-line arrows 47, 48, whereas said circulations are indicated by broken-line arrows. The arrow symbols of course are diagrammatic.

The air entering such currents 47, 48 is derived from the air streams 42, 32, 33. In normal operation the air of said streams is reasonably hot, although such air may be slightly cooler than the air of forward currents 38, 39, the thermal gradient being due to inherent and unavoidable radiation of heat from the extended surfaces of flat oven 10. It will thus be seen that returning or short-circuiting air flows 47, 48 contribute substantially to the desired, added heating of areas 44, 45 into which they circulate.

In addition, the introduction of such return currents 47, 48 causes added heating of said areas 44, 45 and consequent, satisfactory heat equalization between all oven areas, by the inherent creation of eddies 49, 50, 51, 52 along the boundaries of counter-current air flows 47, 38 and 48, 39. Such eddies deflect heated air, of maximum temperature, from currents 38, 39 which flow alongside walls 13, 14, and the deflected hot air is then diffused by such eddies in areas 44, 45. Thus the jet-like and compact form of said hot air currents 38, 39 is largely destroyed and there is created, in effect, the equivalent of an air guiding and distributing structure, in the area receiving heated air, such equivalent being provided by the mere employment of oversize fan aperture 28, in the area wherefrom air is supplied to the heaters.

The operation and functions of the several portions of the new oven are believed to have been explained sufficiently, in the foregoing description, and it will therefore suffice to add a brief statement of the way in which the housewife can use the new combination. Such utilization starts by introducing the goods to be baked in compartment 10, and by virtue of the new construction it is a matter of indifference how the goods are located in this compartment. It is possible for instance to insert a cookie sheet substantially as large as drawer bottom 17, and which is substantially covered by small portions of batter. Heating coils 24, 25 are suitably energized, before or after such introduction of pastry material.

In the absence of circulator 26, cookies adjacent heating coils 24, 25 would usually be overheated and would therefore be in danger of being burned, while other cookies in the oven might still be in substantially raw condition. If on the other hand an air circulator fan rotates in a conventional, relatively closely fitting aperture, provided in a baffle wall which suitably guides the circulating air to the heating coils, it will usually be found that the goods are baked and browned more rapidly in front portion 43, and in limited side areas of back portions 44, than in any other areas of the oven. Although the premature baking and browning, in this latter case, is less rapid than in the case of no circulation at all, the process is still very far from being perfect.

If, on the other hand, in accordance with the invention, there is used a fan and baffle combination 26, 27 with oversize aperture 28 (and also assuming of course that the speed of rotation of fan 26 has been chosen to produce substantial circulations of the type indicated at 47 to 52, by provision of a suitable motor 31, with or without speed adjusting means, not shown), it will be found that baking and browning proceeds uniformly, throughout the entire oven compartment. This remains true whether the temperature employed be in the high, medium or low range, as may be desired for different types of pastry and the like, in accordance with well-known principles.

Thus it will be seen that the new fan and guide wall structure provides full and satisfactory utilization of the oven, without any need for successive rearrangements of pastry goods and/or readjustments of heat input. Thus the new arrangement allows exceedingly simple as well as efficient operation, wherein the householder only needs to determine the condition of the entire supply of cookies or cakes by very occasional and casual observation, through the inspection window, and wherein no rearrangements whatever are necessary during the baking process.

While only a single embodiment of the invention has been described, it should be understood that the details thereof are not to be construed as limitative of the invention, except insofar as is consistent with the scope of the following claims.

I claim:

1. An oven for the domestic baking of pastry and the like, comprising: a generally horizontal wall structure consisting of relatively wide and deep top and bottom walls and of relatively long and low front, back and side walls, whereby the inside of said wall structure forms a wide and low oven chamber, the outside of said wall structure having at least major portions of the walls exposed in such a way that any heat, reaching said outside from said oven chamber, can be substantially freely dissipated; a partition wall, disposed in said oven chamber, having a first port, opposite one of said low walls, and forming a second port with at least one of said other walls; heater means adjacent said partition wall; and a blower fan, disposed generally in said first port and rotatable so as to create a draft of air passing centrally through said first port, toward the adjacent low wall and across said heater means, said fan having a diameter amounting to no more than about 70 to 90% of the distance across said first port and being arranged so that rotation of the fan, tending to create a generally horizontal, primary circulation of heated air through said second port and then along said walls, also creates a major, secondary air circulation peripherally through said first port and through the inner portion of said chamber, countercurrently to large portions of said primary circulation of heated air, thereby distributing the heated air over said inner portion.

2. An oven, defined by a wide and low and widely exposed wall structure, the inside of which forms a generally horizontal oven chamber and which includes wide window area for inspection of said chamber, thereby allowing large amounts of heat to be dissipated from said chamber, and improved forced draft apparatus for counteracting the dissipation of heat, said apparatus comprising: a partition in said oven chamber, having first and second apertures for circulation of a large, forced draft of air through said apertures; heater means in the path of said circulation, adjacent said partition; and a blower fan for creating said forced draft, said fan being generally disposed in the first aperture but covering an area which amounts to no more than about 65% of the area of said first aperture, whereby said forced draft can be maintained so as to include a primary, generally horizontal current if air, across said apertures and heater means and into said chamber, and also to include a large, second current of air, passing through the first aperture in counterflow to said primary current and forcing the air heated by said heater to pass turbulently through said chamber and across said window area, thereby facilitating uniform, domestic baking of pastry in said generally horizontal oven chamber.

3. A domestic pastry oven comprising: a wall structure of relatively wide, relatively low shape, defining an oven chamber of generally similar shape with generally horizontal top and bottom, spaced by front, back and side walls; a partition wall extending along and adjacent the back wall, in said oven chamber, and providing at least two apertures; heater means adjacent said partition wall; a blower fan, disposed generally within one of said apertures, adapted to impel air toward and through the other aperture, and having a diameter amounting to no more than about 75 to 85% of the distance across said one aperture, so that the impelled air returns to said fan as a primary current, passing from said other aperture and through said chamber, and also as a large bypass current, leaving and reentering said one aperture and which prior to such reentering turbulently diffuses said primary current throughout said chamber; and means in a front part of said wall for introducing pastry into said chamber.

References Cited in the file of this patent

UNITED STATES PATENTS

| 1,944,449 | Munro | Jan. 23, 1934 |
| 2,410,285 | Herbster | Oct. 29, 1946 |
| 2,491,420 | Scott | Dec. 13, 1949 |
| 2,611,790 | Koch | Sept. 23, 1952 |
| 2,782,292 | Long | Feb. 19, 1957 |
| 2,862,096 | Gordon | Nov. 25, 1958 |

FOREIGN PATENTS

| 26,497 of 1913 | Great Britain | Nov. 18, 1914 |
| 278,300 | Italy | Oct. 6, 1930 |